US007352897B2

(12) United States Patent
Luo et al.

(10) Patent No.: US 7,352,897 B2
(45) Date of Patent: Apr. 1, 2008

(54) METHOD AND MEANS FOR DIVIDING AN IMAGE INTO CHARACTER IMAGE LINES, AND METHOD AND APPARATUS FOR CHARACTER IMAGE RECOGNITION

(75) Inventors: Zhaohai Luo, Beijing (CN); Yi Li, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 10/234,367

(22) Filed: Sep. 5, 2002

(65) Prior Publication Data

US 2003/0086610 A1    May 8, 2003

(30) Foreign Application Priority Data

Sep. 27, 2001   (CN)   ............... 01 1 40938.X

(51) Int. Cl.
*G06K 9/00*   (2006.01)
(52) U.S. Cl. .................................. 382/171
(58) Field of Classification Search ............ 382/174
See application file for complete search history.

(56) References Cited

U.S. PATENT DOCUMENTS

| 5,119,433 | A | * | 6/1992 | Will ........................... 382/138 |
| 5,307,422 | A | * | 4/1994 | Wang .......................... 382/177 |
| 5,664,071 | A | * | 9/1997 | Nagashima ................ 358/1.3 |
| 6,064,769 | A | * | 5/2000 | Nakao et al. ................ 382/224 |
| 6,327,384 | B1 | * | 12/2001 | Hirao et al. ................ 382/173 |

FOREIGN PATENT DOCUMENTS

| JP | 64-078395 A | 3/1989 |
| JP | 03-252892 A | 11/1991 |
| JP | 05-035913 A | 2/1993 |
| JP | 05-054069 | 3/1993 |
| JP | 07-105309 | 4/1995 |
| JP | 11-025218 | 1/1999 |
| JP | 11-110485 | 4/1999 |
| JP | 2000-298702 | 10/2000 |
| JP | 2000-339402 A | 12/2000 |
| JP | 2002-056356 | 2/2002 |

* cited by examiner

*Primary Examiner*—Bhavesh M. Mehta
*Assistant Examiner*—Alex Liew
(74) *Attorney, Agent, or Firm*—Fitzpatrick, Cella, Harper & Scinto

(57) ABSTRACT

A method for dividing a character image into lines, comprising the following steps: segment-dividing step for, in term of pixels, dividing a character image into a plurality of character image segments arranged sided by side, each segment having a predetermined width; pixel distribution statistic step for obtaining the pixel distribution statistic in each image segment, namely the number of black pixels in each pixel-row of the segment, and obtaining the pixel distribution statistic in the whole image, namely the number of black pixels in each pixel-row of the whole image; segment block forming step for dividing the image segment into segment blocks according to the pixel distribution statistic of the image segments and the pixel distribution statistic of the whole image obtained in the pixel distribution statistic step; line images forming step for integrating the divided segment blocks into line images. According to the above method, the accuracy of line dividing of a character image, especially the accuracy of line dividing of character images having some noise, is improved, whereby the accuracy of character recognition is correspondingly improved.

13 Claims, 11 Drawing Sheets

As the leading elements in economic and social progress in the 21st century, the level of science and technology, especially high technology, determines the comprehensive strength of a country, Jiang said while inspecting the Shanghai Aerospace Equipment Manufacturing Plant.

Jiang was full of praise for the scientists and technicians while inspecting rockets, satellites and other products for national defence at the plant.

The establishment of a modern enterprise system is crucial to SOE reform, Jiang said, adding that SOEs should play a bigger role in leading the country's economic development in the next century.

Fig.3

METHOD AND MEANS FOR DIVIDING AN IMAGE INTO CHARACTER IMAGE LINES, AND METHOD AND APPARATUS FOR CHARACTER IMAGE RECOGNITION

FIELD OF THE INVENTION

This invention relates to a method and means for dividing a character image into image lines, and particularly relates to line dividing for character image recognition.

BACKGROUND ART

The conventional document image recognition algorithm is shown as the flowchart in FIG. 1A. FIG. 1B shows an exemplary arrangement of a conventional document image recognition apparatus. Firstly, in S101 means 112 divides a character image input (for example by scanning) by the input means 111 into character image lines. In S102, means 113 splits the characters in each image line with one another. Means 114 extracts the feature of each split character, then matches and recognizes the characters. In S105, output means 115 output the results of recognition. In a method for document image recognition, the accuracy of line dividing of an image will directly influence the accuracy of the final results of character recognition.

The conventional character image line dividing algorithm is shown as the flowchart in FIG. 2. Firstly, in step S201 an input document image is divided into several image segments by a certain width in the horizontal direction (for example, a width of 400 pixels). Step S202 performs the calculation and recording of the number of black pixels contained in each pixel-row of a width of 400 pixels. In step 203, each image segment is divided, in the vertical direction, into a plurality of segment blocks according to the blank pixel-rows (i.e., the pixel-rows in each of which the number of black pixels is 0) in the image segments. And the information about the segment blocks, for example the width, height and position, is recorded. In step S204, the average height of the segment blocks and so on are calculated, as the standard for further dividing over-large segment blocks and merging over-small segment blocks. In step S205, the over-large segment blocks are further divided according to the average height of the segment blocks. In step S206, the segment blocks are checked, with the over-small segment blocks merged into adjacent segment blocks. In step S207, the segment blocks are integrated into image lines according to the positions of the segment blocks.

For example, in FIG. 3, the document image can be divided into two image segments in the direction of width. With respect to the first segment, the distribution statistic of the black pixels in each pixel-row of the segment is shown as FIG. 4, wherein the abscissa represents pixel-rows in the segments, the ordinate represents the number of black pixels in a respective pixel-row. As to the second image segment, the distribution statistic of black pixels in each pixel-row is shown in FIG. 5.

If the character image in FIG. 3 is divided using the conventional algorithm (see FIG. 2), firstly by using the distribution statistic of pixels in each pixel-row (see FIGS. 4 and 5), the two segments are respectively divided into a plurality of segment blocks according to the blank pixel-rows, in which the number of black pixel is 0. Then the average height of the segment blocks is calculated, and used as a standard for further dividing the divided segment blocks. The over-large segment blocks in each segment, which exceed the average height of the segment blocks to a predetermined extent, are further divided according to the peak-valley relation in the graph of the distribution statistic of black pixels in the interested segment. The segment blocks in each segment, which are lower than the average height of the segment blocks to a predetermined extent, are merged into adjacent segment blocks. However, since the average height of the segment blocks is calculated only once, and the average height of the segment blocks is not re-calculated after an over-large segment blocks is further divided. This is obviously unreasonable. It results in that when the segment blocks which actually need to be further divided, are processed, since their heights do not reach the standard of being necessary to be divided, they are further processed in later procedures (the procedure of splitting the image lines into characters) as reasonable segment blocks, thereby recognition errors occur.

By dividing the document image in FIG. 3 into image lines according to the flowchart shown in FIG. 2, the result of character recognition is as follows:

---

The original result:
-,
'i.,gl"# csa&!sli, tllgiertEwide,i& ..
,',;sild t Ab,.ff& '
W.

---

Thus it can be seen that because of the errors in line dividing, the original 21 lines of effective text are only divided into 8 lines. And due to the errors in the positions and sizes of the image lines, the recognition result is very poor.

SUMMARY OF THE INVENTION

Therefore, this invention is provided to improve the accuracy of character line dividing of a document image, especially to improve the accuracy of character line dividing of document images having some noise, whereby the accuracy of character recognition is correspondingly improved.

Accordingly, an aspect of this invention provides a method for dividing an image into character line images, comprising the following steps: segment-dividing step for, in term of pixels, dividing an input image into a plurality of image segments arranged side by side, each segment having a predetermined width; first pixel distribution statistic step for obtaining the pixel distribution statistic in each image segment, namely the number of black pixels in each pixel-row of the segment; second pixel distribution statistic step for obtaining the pixel distribution statistic in the whole image, namely the number of black pixels in each pixel-row of the whole image; first dividing step for dividing the image segment into segment blocks according to the pixel distribution statistic of the image segments obtained in the first pixel distribution statistic step; determining step for determining an inappropriate segment block from the segment blocks divided in the first dividing step; second dividing step for dividing the determined inappropriate segment block into segment blocks according to the pixel distribution statistic of the whole image obtained in the second pixel distribution statistic step; and line images forming step for integrating the segment blocks divided in the first dividing step and the segment blocks divided in the second dividing step into character line images based on the position of the segment blocks.

Another aspect of this invention also provides an apparatus for dividing an image into character line images, the apparatus comprising: segment-dividing means for, in term of pixels, dividing an input image into a plurality of image segments arranged side by side, each segment having a predetermined width; first pixel distribution statistic means for obtaining the pixel distribution statistic in each image segment, namely the number of black pixels in each pixel-row of the segment; second pixel distribution statistic means for obtaining the pixel distribution statistic in the whole image, namely the number of black pixels in each pixel-row of the whole image; first dividing means for dividing the image segment into segment blocks according to the pixel distribution statistic of the image segments obtained by the first pixel distribution statistic means; determining means for determining an inappropriate segment block from the segment blocks divided by the first dividing means; second dividing means for dividing the determined inappropriate segment block into segment blocks according to the pixel distribution statistic of the whole image obtained by the second pixel distribution statistic means; and line images forming means for integrating the segment blocks divided by the first dividing means and the segment blocks divided by the second dividing means into character line images based on the position of the segment blocks.

This invention also provides a character image recognition method, comprising the following steps: line dividing step for dividing an input image into character line images according to the above method; character extracting and recognition step for extracting and recognizing the characters from the character line images obtained in the line dividing step.

This invention also provides a character image recognition apparatus, comprising: a line dividing means for dividing an input image into character line images according to the above mentioned; a character extracting and recognition means for extracting and recognizing the characters from the character line images obtained by the means for dividing a character image into lines.

This invention also provides a computer program executed by computers to perform the following steps: segment-dividing step for, in term of pixels, dividing an input image into a plurality of image segments arranged sided by side, each segment having a predetermined width; pixel distribution statistic step for obtaining the pixel distribution statistic in each image segment, namely the number of black pixels in each pixel-row of the segment, and obtaining the pixel distribution statistic in the whole image, namely the number of black pixels in each pixel-row of the whole image; segment block forming step for dividing the image segment into segment blocks according to the pixel distribution statistic of the image segments and the pixel distribution statistic of the whole image obtained in the pixel distribution statistic step; line images forming step for integrating the divided segment blocks into character line images.

Yet another aspect of this invention provides a storage medium which stores a program for executing the following steps: segment-dividing step for, in term of pixels, dividing an input image into a plurality of image segments arranged side by side, each segment having a predetermined width; first pixel distribution statistic step for obtaining the pixel distribution statistic in each image segment, namely the number of black pixels in each pixel-row of the segment; second pixel distribution statistic step for obtaining the pixel distribution statistic in the whole image, namely the number of black pixels in each pixel-row of the whole image; first dividing step for dividing the image segment into segment blocks according to the pixel distribution statistic of the image segments obtained in the first pixel distribution statistic step; determining step for determining an inappropriate segment block from the segment blocks divided in the first dividing step; second dividing step for dividing the determined inappropriate segment block into segment blocks according to the pixel distribution statistic of the whole image obtained in the second pixel distribution statistic step; and line images forming step for integrating the segment blocks divided in the first dividing step and the segment blocks divided in the second dividing step into character line images based on the position of the segment blocks.

BRIEF DESCRIPTION OF THE DRAWINGS

FIG. 3 is a document image to be processed as the object of character image recognition;

EMBODIMENTS

Figure 1A:
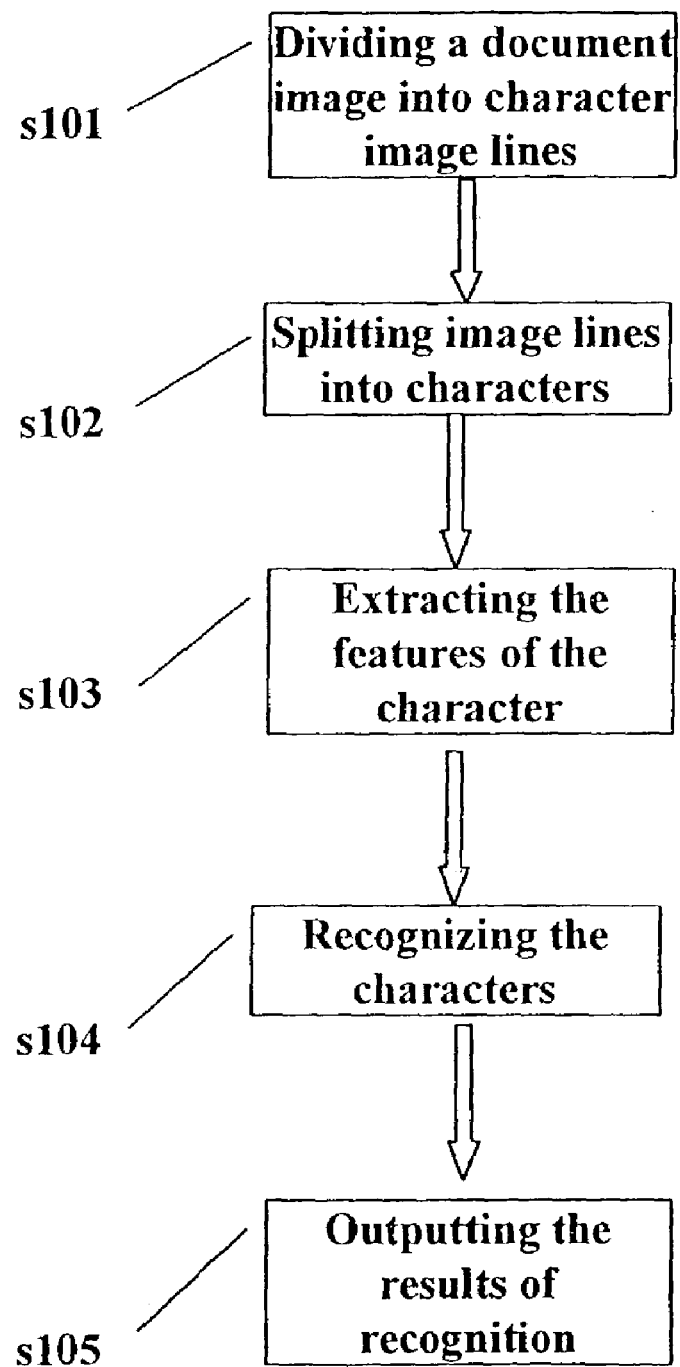
FIG. 1A is the flow chart of the conventional character image recognition method.

The embodiments are described as follows referring to the drawings.

By analyzing the conventional algorithm, it can be seen that if the noise in a segment of image is relatively focused in a certain region, it will "cover" the blank pixel-rows in the region. If the noise is intensive, the difference between a "peak" and a "valley" in the graph of the pixel distribution statistic will be reduced, such that it will be more difficult to determine the positions of the text lines. Therefore, the inventors set forth a new method for character image line-dividing (see FIG. 6A).

Figure 6A:
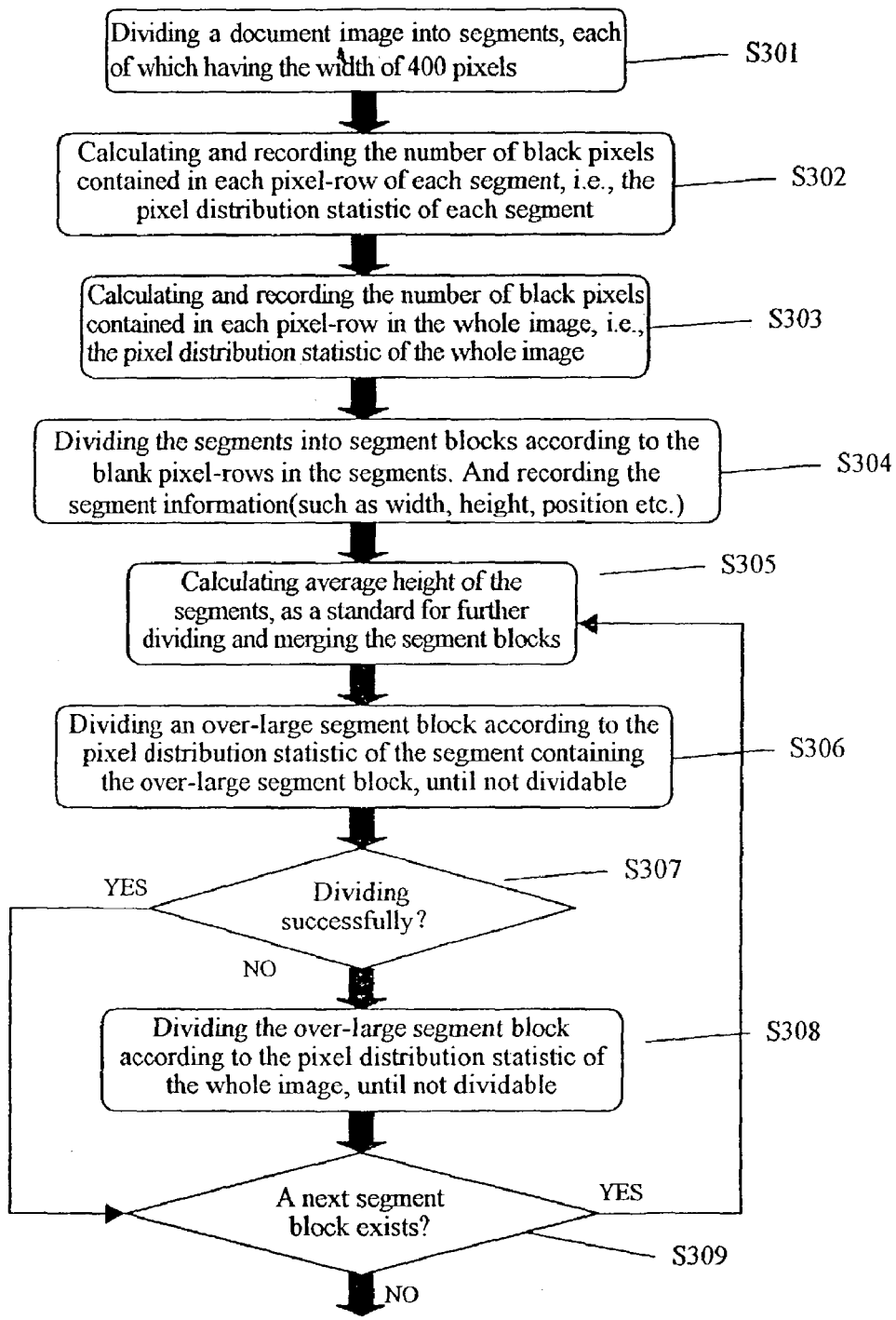
FIGS. 6A and 6B is the flow chart of the character image line dividing method according to the present invention.
Figure 6B:
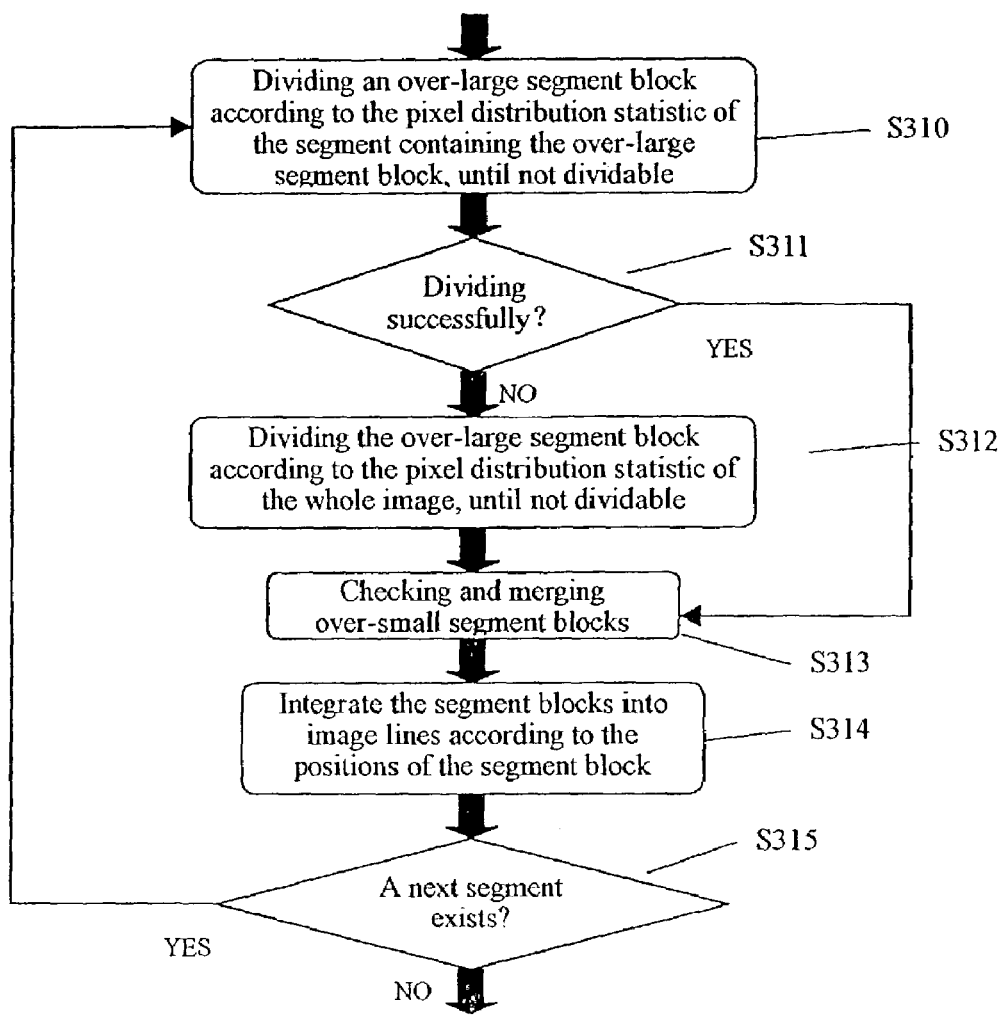
Figure 6C:
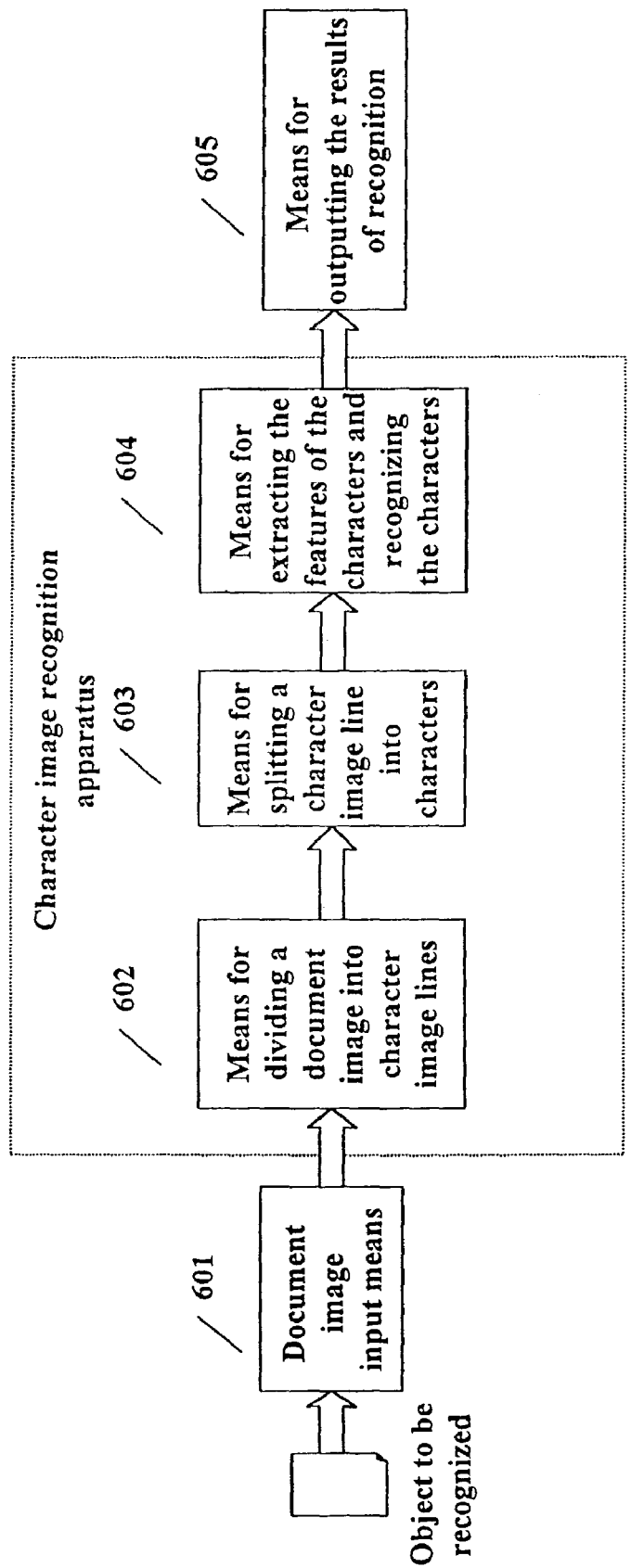
FIGS. 6C is the arrange of the character image recognition apparatus according to the present invention.

As shown in FIG. 6C, by means of document image input means 601 (such as a scanner etc.), a document image is input into character image line dividing means 602 for dividing the document image into character image line. Character splitting means 603 splits the character image lines into characters. Character feature extracting and recognition means 604 extracts the features of the split characters and recognize the characters. The recognition results are output by output means 605, for further processing such as displaying, storing or document processing and so on.

Figure 6D:
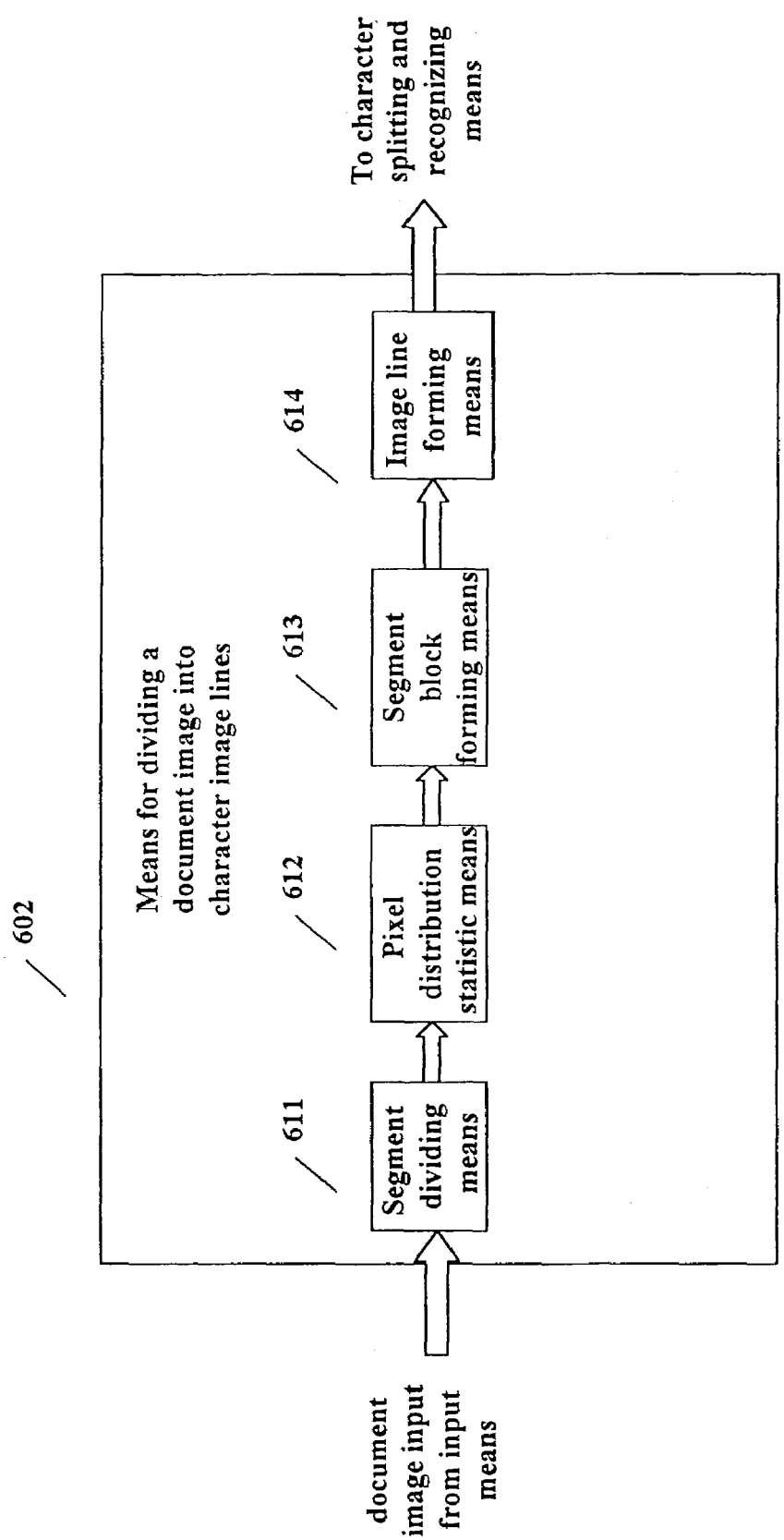
FIG. 6D is the arrangement of the character image line dividing means according to the present invention.

The character image line dividing means 602 divides the document image into character image lines according to the flow chart shown in FIG. 6A. The arrangement of the character image line dividing means 602 is exemplarily shown in FIG. 6D.

Through steps S301 to S309, a segment of document image is divided into segment blocks.

In step S301, segment-dividing means 611 divide the input document image (see FIG. 3) into a plurality of image segments horizontally arranged, each of which has a predetermined width (for example 400 pixels). As to the last segment divided, if its width does not reach the predetermined width, it can be deemed as a segment.

Figure 4:
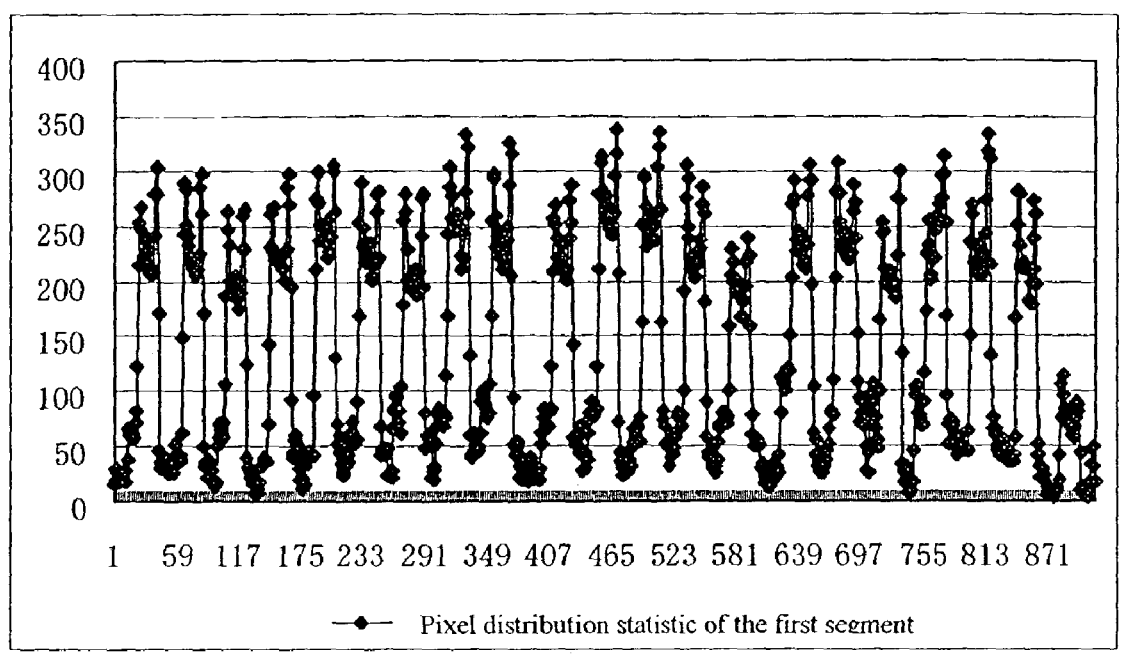
FIG. 4 is a graph showing the distribution statistic of pixels, showing the distribution statistic of black pixels in each row of pixels in the first segment of the document image of FIG. 3.
Figure 5:
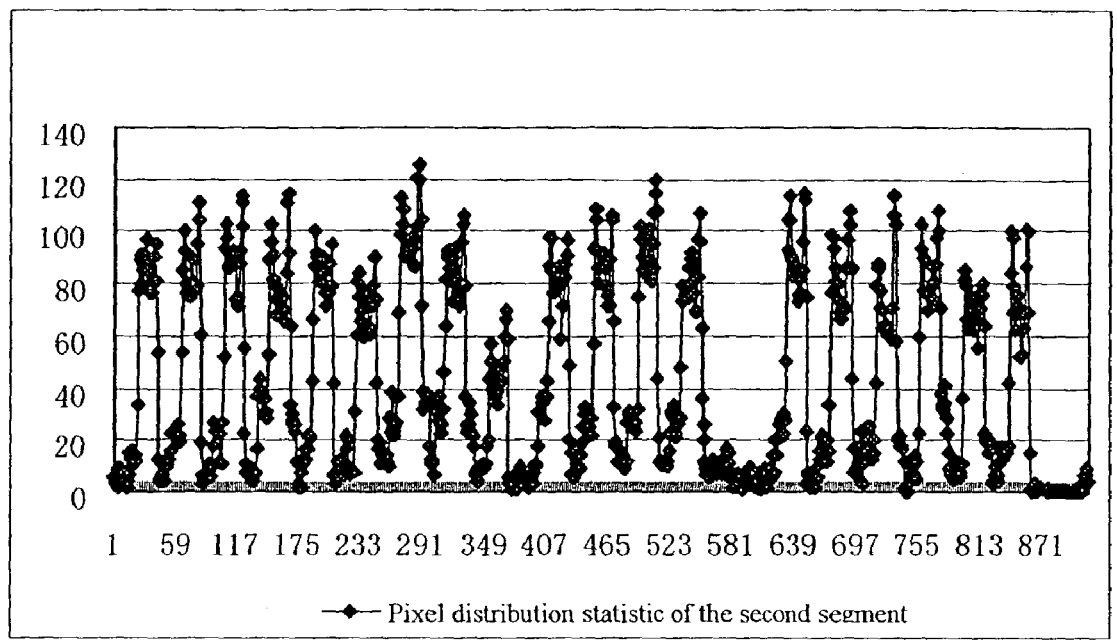
FIG. 5 is a graph showing the distribution statistic of pixels, showing the distribution statistic of black pixels in each row of pixels in the second segment of the document image of FIG. 3.

In step S302, the pixel distribution statistic means 612 respectively calculates and records the number of black pixels contained in each pixel-row in each image segment, i.e., the pixel distribution statistic of each segment, so as to obtain the graphs of pixel distribution statistic shown in FIGS. 4 and 5, wherein the abscissa represents the pixel-rows, and the ordinate represents the number of black pixels in each pixel-row.

Figure 7:
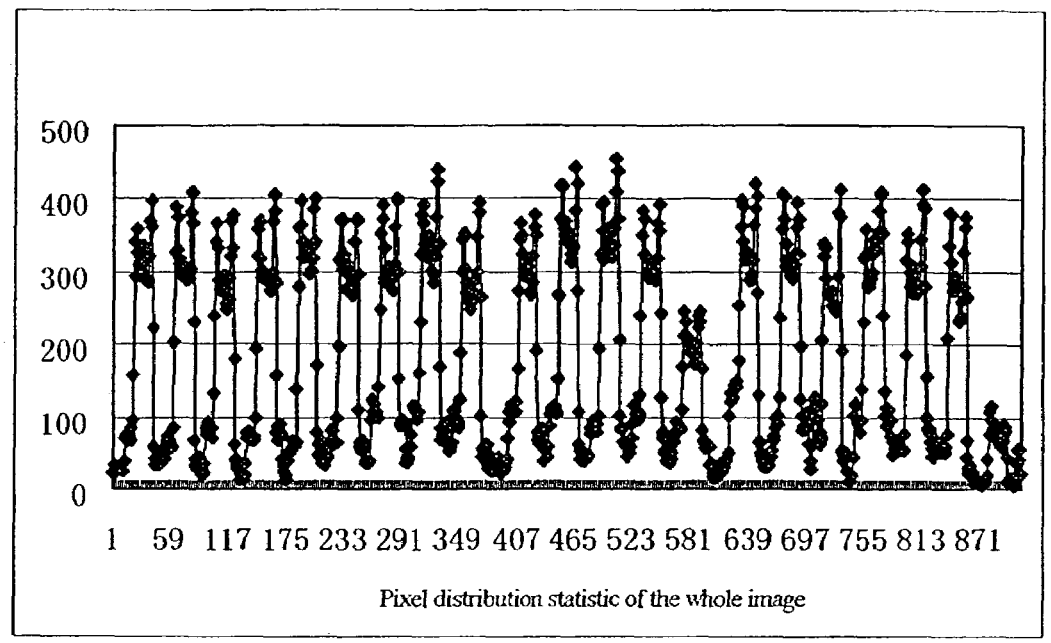
FIG. 7 is a graph showing the distribution statistic of pixels, showing the distribution statistic of black pixels in each row of pixels in the whole character image of FIG. 3.

In step S303, the pixel distribution statistic means 612 respectively calculates and records the number of black pixels contained in each pixel-row in the whole image, i.e., the pixel distribution statistic of the whole image, so as to obtain the graph of pixel distribution statistic shown in FIG. 7, wherein the abscissa represents the pixel-rows of the whole image, and the ordinate represents the number of black pixels in each pixel-row of the whole image.

In step S304, segment block forming means 613 firstly divides the image segments into segment blocks according to the positions of the blank rows of pixels, in which the numbers of black pixels are 0, in the graph of pixel distribution statistic of each image segment. At the same time, the information about a segment block is recorded, such as the width, height and position of a segment block.

In step S305, the average height of all the segment blocks is calculated, as the standard for further dividing and merging.

As to a normal character image, it is usually impossible to divide all the character lines only by means of blank rows of pixels. For example, there is usually "noise" among the character lines, such as black spots. Therefore, in step S306, it is determined according to the average height whether there exist over-large segment blocks. An over-large segment block is further divided according to the pixel distribution statistic of the segment containing said over-large segment, for example by using a "valley" being low to a certain extent as a boundary for dividing, until not dividable.

In step S307, it is determined whether the over-large segment block can be successfully divided according to the pixel distribution statistic of the segment containing the large segment block. If the above division is successful, it is determined in step S309 whether there exist a next segment block. If so, the average height of the segment blocks is re-calculated as the standard for further dividing and merging, and for further dividing the next over-large segment block until not dividable. If it is determined in step S307 that the above division is not successful, then the over-large segment block will be further divided according to the pixel distribution statistic of the whole image in step S308. Then it proceeds to step S309.

Through steps S310 to S315, the divided segment blocks are further divided and merged.

In step S310, the pixel distribution statistic of the pixel-rows in the segments is used to divide over-large segment blocks, until not dividable.

In step S311, if it is determined that dividing cannot be done successfully, for example, if intensive "noise" exists in the segment block, the large segment block cannot be further divided according to the pixel distribution statistic of segments containing the large segment block, then it proceeds to step S312. In step S312, the pixel distribution statistic of the whole image is used to divide over-large segment blocks. For example, a "valley" in the graph of pixel distribution statistic of the whole image, which is low to a predetermined extent, is used as boundary for dividing the segment block not dividable in step S310, until not dividable. Then it proceed to step S313, in which the divided segment blocks are checked to merge over-small segment blocks (i.e., the height of which is low to a predetermined extent) into the adjacent segment blocks. If in step S311, it is determined that the over-large segment block can be divided according to the pixel distribution statistic of the segments, it proceeds to step S313 to perform checking and merging of small segment blocks.

In step S314, image line forming means 614 integrates the divided segment blocks into image lines according to the positions of the segment blocks. In step S315, it is determined whether there exists a next segment block not processed. If all the segment blocks have been processed through steps S310 to S314, then subsequent processes are performed to the image lines obtained, such as character splitting process, character recognition process and so on, to complete the character image recognition.

It can be seen that, the improvement of the method of this invention mainly lie in the following two aspects:

1. The pixel distribution statistic of each segment and the pixel distribution statistic of the whole image are introduced. The advantage thereof is that: when the "noise" is only concentrated in a certain region, the pixel distribution statistic of the whole image (in the row direction) will not be badly influenced by the intensity of noise in the certain region. So the distance between a "peak" and a "valley" will be "extended", such that the boundary between text lines will be more distinct.

2. The flow chart of line-dividing is improved. The conventional algorithm calculates the average height of segment blocks only once, and does not re-calculate the average height of segment blocks after an over-large segment block is further divided. This is obviously unreasonable. The improved algorithm of this invention re-calculates the average height of the segment blocks, after each over-large block is divided, such that the reasonable height of segment blocks can be determined more accurately.

By dividing the document image in FIG. 3 into lines according to the flow chart show in FIG. 6, the result of character recognition is as follows:

---

The new result:
As the Iqding alemgnts ils qco-
Nomic and eocial progress
inttrc 21st eenfury, the level
ofscience and tmhnology,
especiaJly high technologr,
determinos the @ilr-
prehensivarJiength of a pprrir:
try, Jiapgtdd whfle inspeffitg
the Shengt_ii Aercspae Eq&ig
ment If itsrtiS$fi rring Plsnt.
Jiang was._ffrll of praise fortbe
.ecientisp gff ;tbch,nieians
ivbib inepecting"to*ets'
satelites apiil rther profitti for
national.GE" fence attffpffit.
::; 1 he estEbiftSnBnt of a -continued

```
modfui ttuerpriGiS##em is
crucial to SOB refomn, Jiang
said, adding That SOb'sbsld
play a bUger .role in Iqeding,the
countfs eco-nomic daeiopment
in the next centuly.'
```

Thus it can be seen that all the 21 lines of text are correctly divided. Thus, since the text lines can be divided more accurately, the accuracy of character image recognition is directly enhanced.

As mentioned above, this invention is exemplarily described with specific examples. But the spirit of this invention should not be limited to the examples, and should be defined and generalized by the claims attached.

In the present embodiment, the character image recognition apparatus having the structure as described above is realized by a computer, which executes the reading of a program. The computer is structured by a CPU for executing a calculation process, a RAM to be used as a work-area after reading a program, a recording medium for storing programs and various data for executing the process corresponding to the flowchart, such as a hard disk, a ROM and a removable disk (a floppy disk, a CD-ROM etc.), a keyboard and a pointing device for executing various operations a display for displaying a text to be processed and a network interface for connecting with a network. The program for executing a CPU can be the one supplied from said recording medium or the one read from an external apparatus through a network. Moreover, in the present embodiment the present embodiment the present invention is realized by a computer's execution of a program, but a part of or all of the program can be structure by hardware.

What is claimed is:

1. A method for dividing an image into character line images, comprising the following steps:
    segment-dividing step for dividing an input image into a plurality of image segments arranged side by side, each segment having a predetermined width;
    first pixel distribution statistic step for obtaining the pixel distribution statistic in each image segment divided in said segment-dividing step, based on the number of black pixels in each pixel-row of the image segment divided in said segment-dividing step;
    second pixel distribution statistic step for obtaining the pixel distribution statistic in the whole of the input image, based on the number of black pixels in each pixel-row of the whole input image;
    first dividing step for dividing the image segment into segment blocks according to the pixel distribution statistic of the image segments obtained in said first pixel distribution statistic step;
    determining step for determining an inappropriate segment block from the segment blocks divided in said first dividing step;
    second dividing step for dividing the determined inappropriate segment block into segment blocks according to the pixel distribution statistic of the whole of the input image obtained in said second pixel distribution statistic step; and
    line images forming step for integrating the segment blocks divided in said first dividing step and the segment blocks divided in said second dividing step into character line images based on the position of the segment blocks.

2. A method according to claim 1,characterized in that in said first dividing step, the image segments are divided into the segment blocks by using the blank pixel-rows in the pixel distribution statistic of the image segments obtained in said first pixel distribution statistic step as boundaries for dividing.

3. A method according to claim 1,characterized in that in said determining step, the inappropriate segment block is an over-large segment block, the over-large segment block being determined based on the average height of the segment blocks.

4. A method according to claim 1,further comprising a merging step for determining whether there are over-small segment blocks based on the average height of the segment blocks, and for merging the determined over-small segment blocks with adjacent segment blocks.

5. A method according to claim 3,characterized in that the average height of the segment blocks is recalculated after each over-large block is divided, for determining whether the divided segment blocks are over-large or over-small.

6. A character image recognition method, comprising the following steps:
    line dividing step for dividing an input image into character line images according to the method of claim 1; and
    character extracting and recognition step for extracting and recognizing the characters from the character line images obtained in the line dividing step.

7. An apparatus for dividing an image into character line images, the apparatus comprising:
    segment-dividing means for dividing an input image into a plurality of image segments arranged side by side, each segment having a predetermined width;
    first pixel distribution statistic means for obtaining the pixel distribution statistic in each image segment divided in said segment-dividing step, based on the number of black pixels in each pixel-row of the image segment divided in said segment-dividing step;
    second pixel distribution statistic means for obtaining the pixel distribution statistic in the whole of the input image, based on the number of black pixels in each pixel-row of the whole input image;
    first dividing means for dividing the image segment into segment blocks according to the pixel distribution statistic of the image segments obtained by said first pixel distribution statistic means;
    determining means for determining an inappropriate segment block from the segment blocks divided by said first dividing means;
    second dividing means for dividing the determined inappropriate segment block into segment blocks according to the pixel distribution statistic of the whole of the input image obtained by said second pixel distribution statistic means; and
    line images forming means for integrating the segment blocks divided by said first dividing means and the segment blocks divided by said second dividing means into character line images based on the position of the segment blocks.

8. An apparatus according to claim 7, characterized in that said first dividing means divides the image segments into the segment blocks by using the blank pixel-rows in the pixel distribution statistic of the image segments obtained in said first pixel distribution statistic step as boundaries for dividing.

9. An apparatus according to claim 7, characterized in that said determining means determines over-large segment blocks based on the average height of the segment blocks, and wherein the inappropriate segment block is the over-large segment block.

10. An apparatus according to claim 7, further comprising a merging step for determining whether there are over-small segment blocks based on the average height of the segment blocks, and for merging the determined over-small segment blocks with adjacent segment blocks.

11. An apparatus according to claim 9, characterized in that said determining means re-calculates the average height of the segment blocks after each over-large block is divided, for determining whether the divided segment blocks are inappropriate segment blocks.

12. A character image recognition apparatus, comprising:
 a line dividing means for dividing an input image into character line images according to claim 7; and
 a character extracting and recognition means for extracting and recognizing the characters from the character line images obtained by the means for dividing a character image into lines.

13. A storage medium which stores a program for executing the following steps:
 segment-dividing step for dividing an input image into a plurality of image segments arranged side by side, each segment having a predetermined width;
 first pixel distribution statistic step for obtaining the pixel distribution statistic in each image segment divided in said segment-dividing step, based on the number of black pixels in each pixel-row of the segment divided in said segment-dividing step;
 second pixel distribution statistic step for obtaining the pixel distribution statistic in the whole of the input image, based on the number of black pixels in each pixel-row of the whole input image;
 first dividing step for dividing the image segment into segment blocks according to the pixel distribution statistic of the image segments obtained in said first pixel distribution statistic step;
 determining step for determining an inappropriate segment block from the segment blocks divided in said first dividing step;
 second dividing step for dividing the determined inappropriate segment block into segment blocks according to the pixel distribution statistic of the whole of the input image obtained in said second pixel distribution statistic step; and
 line images forming step for integrating the segment blocks divided in said first dividing step and the segment blocks divided in said second dividing step into character line images based on the position of the segment blocks.

* * * * *

UNITED STATES PATENT AND TRADEMARK OFFICE
CERTIFICATE OF CORRECTION

PATENT NO.         : 7,352,897 B2
APPLICATION NO. : 10/234367
DATED                  : April 1, 2008
INVENTOR(S)       : Zhaohai Luo et al.

It is certified that error appears in the above-identified patent and that said Letters Patent is hereby corrected as shown below:

TITLE PAGE, ITEM [57] ABSTRACT

Line 3, "term" should read --terms--.
Line 4, "sided" should read --side--.

SHEET 2

Figure 1B:
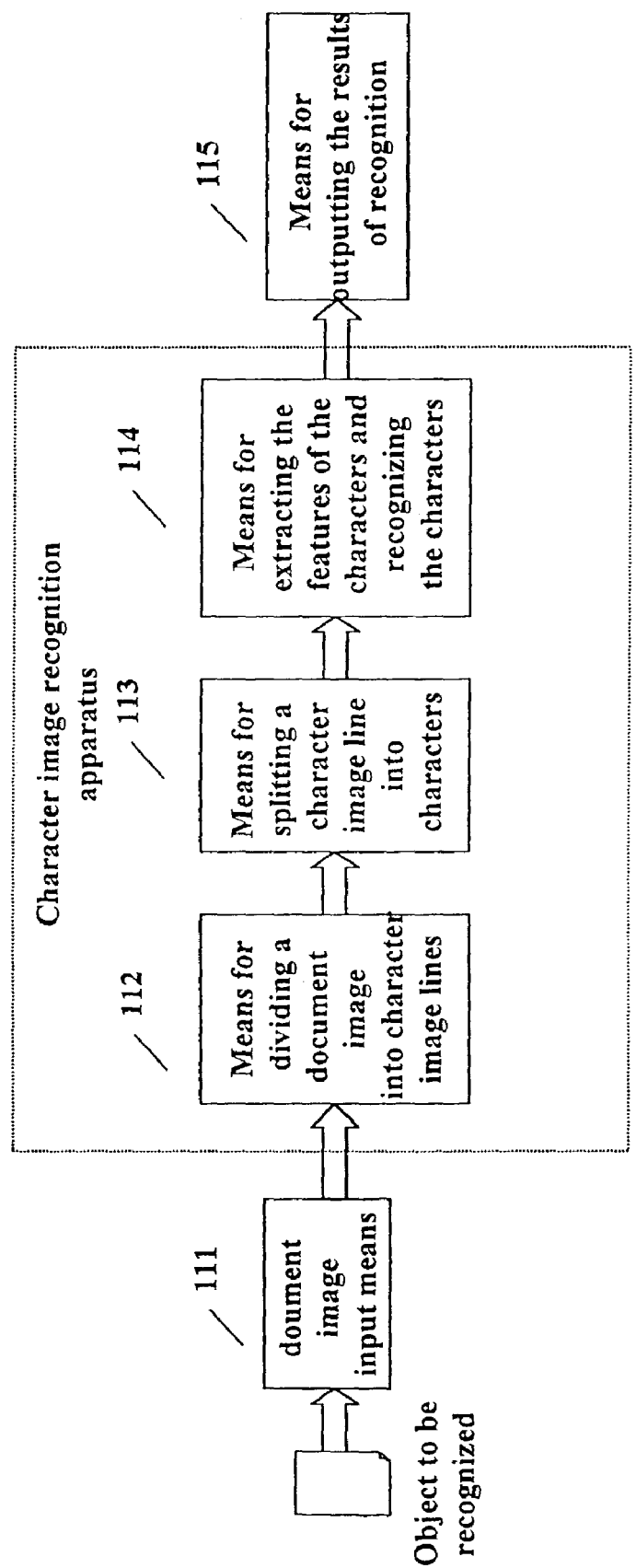
FIG. 1B shows the exemplary arrangement of a conventional character image recognition apparatus.
Figure 2:
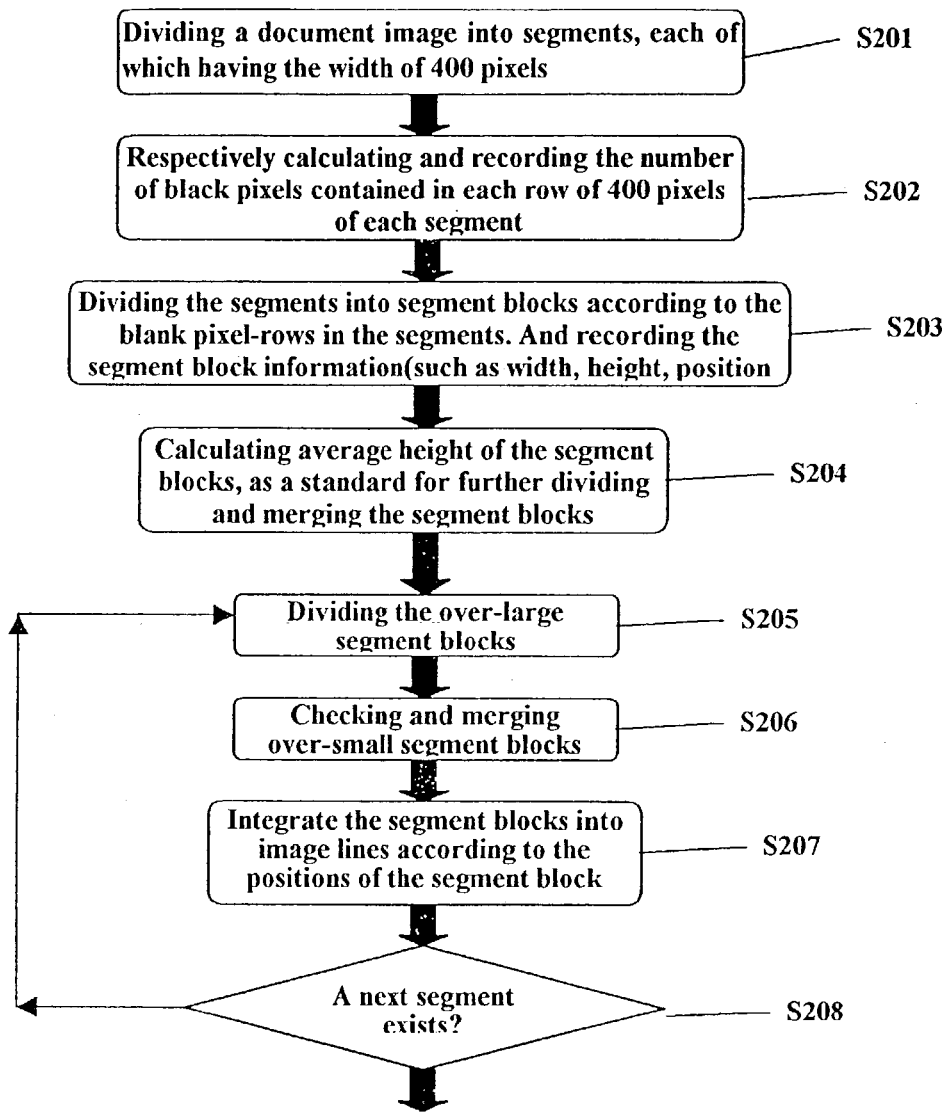
FIG. 2 shows the flow chart of a conventional line dividing algorithm of character image.

Figure 1B, "doument" should read --document--.

COLUMN 1

Line 23, "output" should read --outputs--.

COLUMN 2

Line 44, "term" should read --terms--.

COLUMN 3

Line 1, "term" should read --terms--.
Line 40, "term" should read --terms--.
Line 57, "term" should read --terms--.

COLUMN 4

Line 34, "arrange" should read --arrangement--.
Line 37, "invention;" should read --invention; and--.
Line 62, "recognize" should read --recognizes--.

COLUMN 5

Line 1, "FIG. 6A." should read --FIGS. 6A and 6B.--.
Line 6, "divide" should read --divides--.
Line 52, "exist" should read --exists--.

UNITED STATES PATENT AND TRADEMARK OFFICE
CERTIFICATE OF CORRECTION

PATENT NO. : 7,352,897 B2
APPLICATION NO. : 10/234367
DATED : April 1, 2008
INVENTOR(S) : Zhaohai Luo et al.

It is certified that error appears in the above-identified patent and that said Letters Patent is hereby corrected as shown below:

COLUMN 6

Line 10, "proceed" should read --proceeds--.
    Line 28, "lie" should read --lies--.
    Line 48, "FIG. 6," should read --FIGS. 6A and 6B,--.

COLUMN 7

Line 27, "operation" should read --operations,--.
    Line 32, "embodiment the present embodi-" should read --embodiment,--.
    Line 33, "ment" should be deleted.
    Line 35, "structure" should read --structured--.

COLUMN 8

Line 1, "claim 1,characterized" should read --claim 1, characterized--.
    Line 7, "claim 1,characterized" should read --claim 1, characterized--.
    Line 12, "claim 1,further" should read --claim 1, further--.
    Line 17, "claim 3,characterized" should read --claim 3, characterized--.

Signed and Sealed this

Ninth Day of December, 2008

JON W. DUDAS
*Director of the United States Patent and Trademark Office*